May 10, 1955
H. N. SCHMIDT
2,707,860
HARVESTER FOR HEADED VEGETABLES
Filed Jan. 5, 1954
2 Sheets-Sheet 2
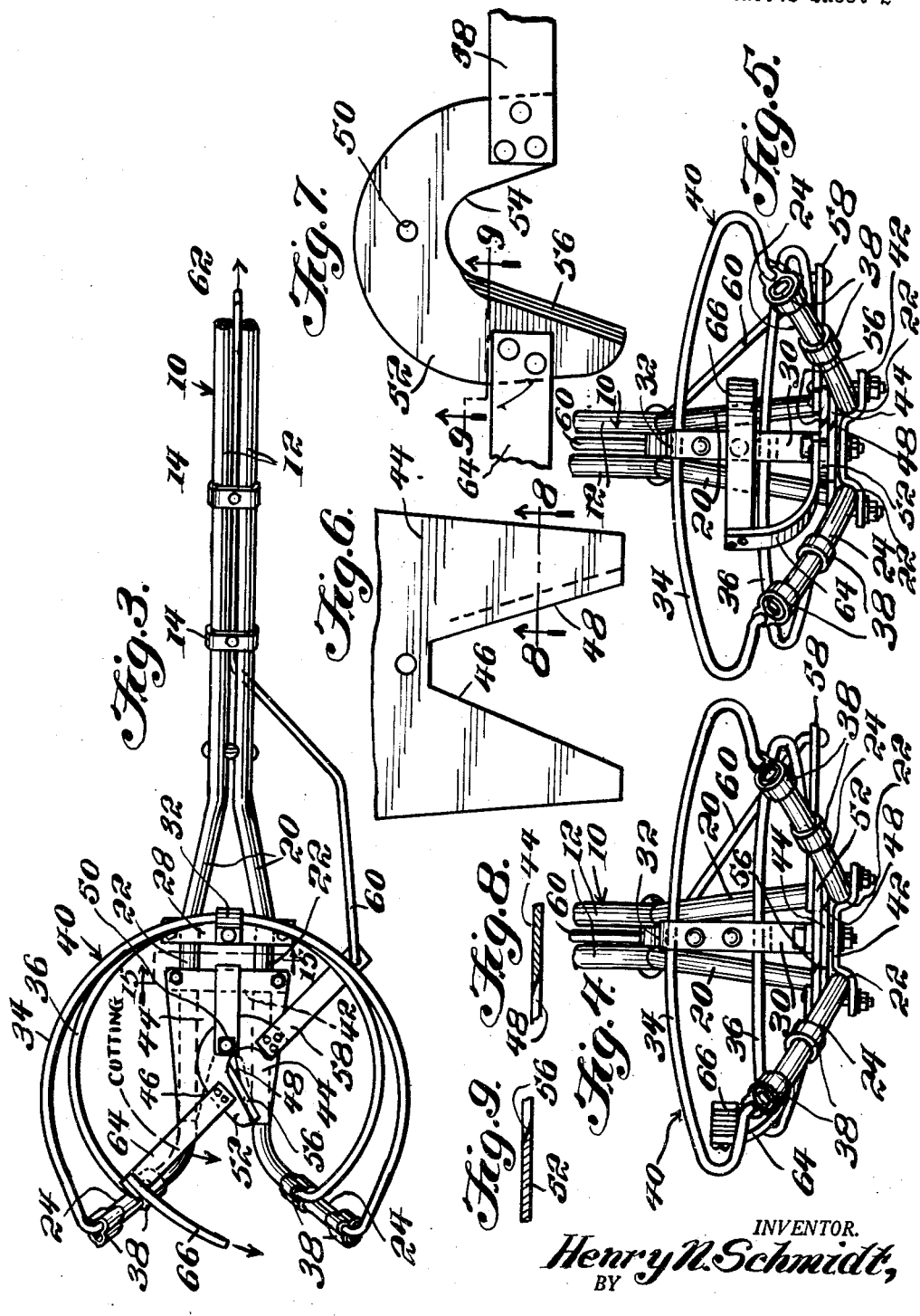
INVENTOR.
Henry N. Schmidt,
BY
McMorrow, Berman & Davidson
ATTORNEYS

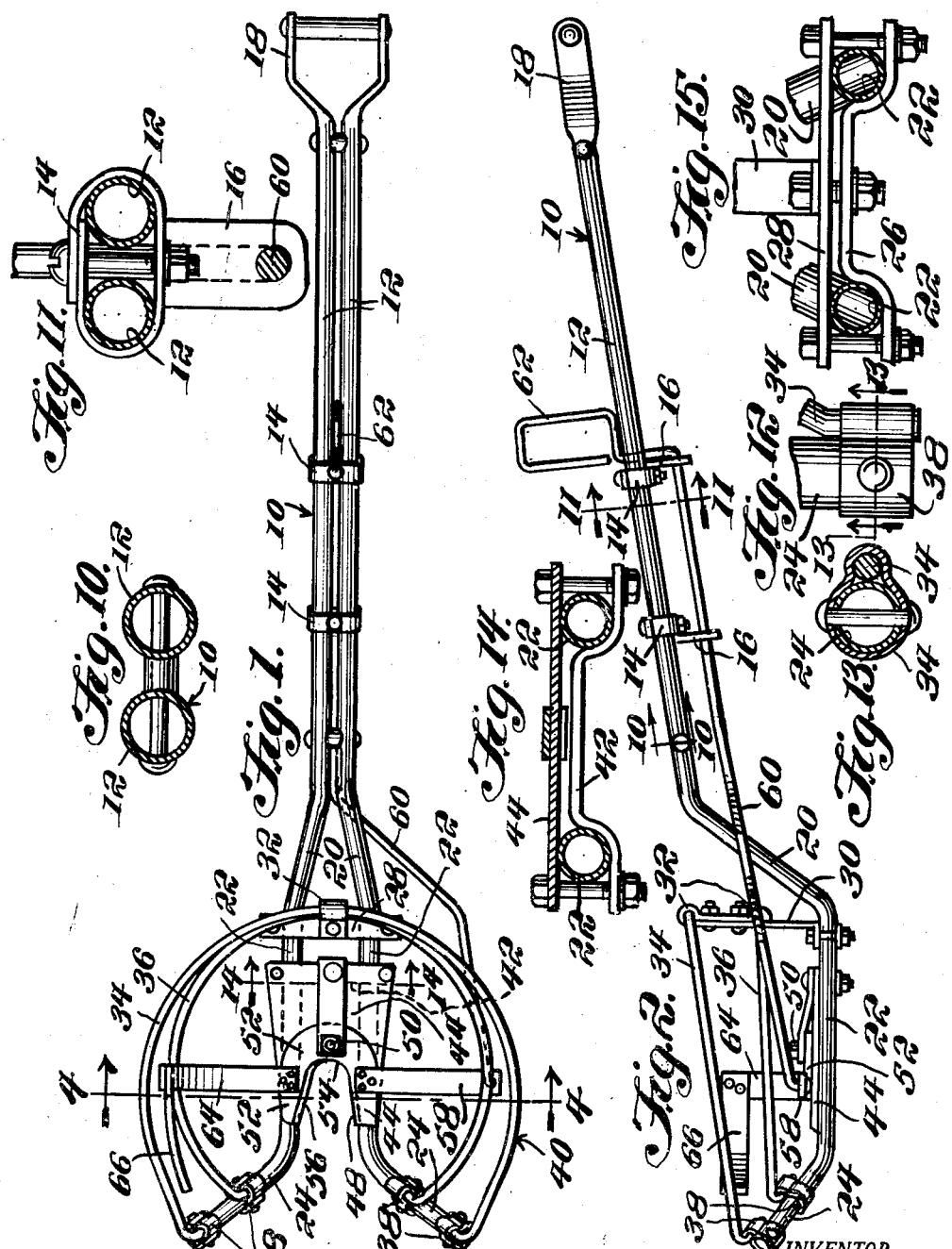

United States Patent Office 2,707,860
Patented May 10, 1955

2,707,860

HARVESTER FOR HEADED VEGETABLES

Henry N. Schmidt, West Allis, Wis.

Application January 5, 1954, Serial No. 402,253

1 Claim. (Cl. 56—327)

This invention relates to a harvester for headed vegetables and has for its primary object the severing of the head of the vegetable from the stalk thereof and the retaining of the severed head on the harvester.

Another object is to retain the severed head on the harvester until such time as it is removed therefrom by a deliberate action of the user.

A further object is to facilitate the rapid harvesting of headed vegetables and to increase the efficiency of those engaged in such harvesting operations.

The above and other objects may be attained by employing this invention which embodies among its features a handle, a ledger blade carried by the handle and extending thereacross adjacent one end thereof, said blade having a vegetable stalk receiving recess opening through the side thereof remote from the handle, a vegetable head receiving and supporting cage carried by the handle and extending upwardly therefrom in partially surrounding relation to the ledger blade, said cage having an opening in the side thereof which registers with the recess in the ledger blade, a cutting blade carried by the handle for movement across the recess in the ledger blade and cooperation with said ledger blade in shearing a vegetable stalk extending through the recess, and means carried by the handle for moving the cutting blade across the recess in the ledger blade.

Other features include a finger carried by the cutting blade for movement therewith across the opening in the cage to cooperate with the cage in supporting a head severed from a vegetable stalk by the cutting blade.

Still other features include a pair of parallel tubular bars defining a handle, legs carried by the handle and projecting longitudinally therefrom adjacent one end thereof, upwardly and outwardly extending arms carried by the legs, a ledger blade carried by the legs and having a recess extending thereinto through the end thereof adjacent the arms, curved bars carried by the arms and extending around the ledger blade and adjacent the handle to define an open sided cage for receiving the severed head of a vegetable, a cutter blade carried by the ledger blade for movement across the recess to sever the head of a vegetable from the stalk thereof, and a finger carried by the cutting blade for movement therewith across the open side of the cage to retain the severed head of the vegetable in the cage.

In the drawings:

Figure 1 is a top plan view of a vegetable harvester embodying the features of this invention;

Figure 2 is a side view in elevation of the harvester illustrated in Figure 1;

Figure 3 is a fragmentary top plan view showing the cutting blade moved across the ledger blade and the vegetable head retaining finger projected across the open side of the vegetable head receiving cage;

Figure 4 is an enlarged front view in elevation of a fragment of the harvester;

Figure 5 is a view similar to Figure 4, showing the parts in a different position;

Figure 6 is a fragmentary enlarged plan view of the ledger blade;

Figure 7 is a fragmentary enlarged plan view of the movable blade;

Figure 8 is a fragmentary sectional view taken substantially on the line 8—8 of Figure 6;

Figure 9 is a fragmentary sectional view taken substantially on the line 9—9 of Figure 7;

Figure 10 is an enlarged transverse sectional view taken substantially on the line 10—10 of Figure 2;

Figure 11 is a fragmentary enlarged sectional view taken substantially on the line 11—11 of Figure 2;

Figure 12 is an enlarged fragmentary view of the outer end of one of the arms;

Figure 13 is a sectional view taken substantially on the line 13—13 of Figure 12;

Figure 14 is a fragmentary enlarged sectional view taken substantially on the line 14—14 of Figure 1; and Figure 15 is a fragmentary enlarged sectional view taken substantially on the line 15—15 of Figure 3.

Referring to the drawings in detail, a handle designated generally 10 comprises spaced parallel tubular members 12 which are held together in spaced parallel relation by longitudinally spaced clamps 14 carrying depending brackets 16 having aligned openings extending therethrough. Carried by the handle 10 adjacent one end thereof is a D-handle 18 and the ends of the tubular members 12 remote from the D-handle 18 diverge as at 20 and extend downwardly, as will be readily understood upon reference to Figure 2. Carried by the divergent extensions 20 and extending longitudinally in spaced parallel relation from the ends thereof remote from the tubular members 12 are spaced parallel legs 22 which terminate at their ends remote from the extensions 20 in upwardly and outwardly extending arms 24 which define an entrance throat for the stalk of a headed vegetable.

Clamped as by a clamp bar 26 to the legs 22 is a cross member 28 carrying intermediate its ends the standard 30 which extends upwardly substantially midway between the legs 22. Extending through vertically spaced eyes 32 carried by the standard 30 and extending downwardly and forwardly from said standard are arched bars 34 and 36 which are coupled by suitably spaced clamps 38 to the arms 24. These arched bars 34 and 36 define with the diverging arms 24, legs 22, and the standard 30 an open ended basket designated generally 40 for receiving and supporting the head cut from the stalk of a headed vegetable. As shown in Figures 1 and 3, the open end of the basket registers with the recess in the ledger blade to be more fully hereinafter described.

Clamped as by a clamp bar 42 to the legs 22 adjacent the cross bar 28 is a ledger blade 44 having formed in the end thereof remote from the cross member 28 a recess 46, one wall of which is sharpened to provide a cutting blade 48.

Pivotally mounted as at 50 to move across the recess 46 in the ledger blade 44 is a movable blade 52 of substantially U-shaped configuration to provide a substantially V-shaped recess 54, one wall of which is sharpened as at 56 to define a cutting edge which cooperates with the edge 48 of the ledger blade 44 in shearing the stem or stalk of a plant.

Carried by and extending outwardly from the cutting blade 52 is an actuating arm 58 to which is connected remote from the blade 52 one end of a longitudinally movable slide rod 60 which is mounted in the brackets 16 for longitudinal sliding movement and carries at its end remote from the arm 58 an upwardly extending handle loop 62 which moves in a rectilinear path which aligns the space between the tubular members 12, as will be readily understood upon reference to Figures 1 and 2. It will thus be seen that by reciprocating the handle 62 on the handle member 10, the blade 52 will be rocked about its pivot 50 so that the cutting edge 56 of said blade 52 moves across the opening 46 in the ledger blade 44 toward the sharpened edge 48 of said ledger blade to cooperate with said sharpened edge in severing the stalk of a plant.

Carried by and extending outwardly from the blade 52 on the side thereof remote from the arm 58 is an arm 64 which, as illustrated in Figures 2, 4 and 5, curves upwardly as it recedes from the blade 52 and carries adjacent its upper end an arcuate finger 66 which moves in an arcuate path from a position adjacent one side of the opening between the arms 24 to a position in which it extends across said opening when the blade 52 is moved through its cutting arc by the handle member 62.

In use, with the parts in the position illustrated in Figures 1 and 4, the device is advanced toward a headed plant with the stalk thereof guided into the recess 46 in the ledger blade 44 and with the cutting blade 52 in the position illustrated in Figures 1, 2 and 4. With the head receiving basket 40 thus closely embracing the head of the plant, pull is exerted on the handle 64 to move it longitudinally through the guides 16 and cause the blade 52 to rock about the pivot 50 so that the cutting edge 56 thereof will be advanced toward the cutting edge 48 of the ledger blade to shear the stalk of the plant. With the stalk thus sheared, the head will rest in the basket 40 and due to the fact that with the movement of the blade 52 about the pivot 50, the finger 66 will move across the space between the arms 24, it will be evident that the head will be held in the basket until such time as the user disposes of the contents of the basket and deposits it at a selected point. In this way, headed vegetables such as cabbage, lettuce and cauliflower may be readily harvested without requiring the bending over of the user.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

A harvester for headed vegetables comprising a handle, spaced parallel legs carried by the handle and extending longitudinally therefrom adjacent one end thereof, arms carried by the legs and extending upwardly and outwardly therefrom adjacent the ends thereof remote from the handle to define guides between which passes the stalk and the head of a headed vegetable, a ledger blade carried by the legs and extending therebetween adjacent the ends thereof remote from the handle, a cutting blade carried by the ledger blade for movement thereacross in shearing relation thereto, means carried by the handle and operatively connected to the cutting blade for moving it across the ledger blade to sever the head of a headed vegetable from the stalk thereof, a standard carried by the legs and extending upwardly therefrom adjacent the handle, arched bars carried by the standard and connected to the arms to define therewith a head receiving basket having a passage opening therethrough in registration with the space between the guides, and a finger carried by the cutting blade for movement therewith across the passage in the basket to retain therein a head severed from the stalk of a vegetable.

References Cited in the file of this patent

UNITED STATES PATENTS

| Number | Name | Date |
|---|---|---|
| 576,326 | Reed | Feb. 2, 1897 |
| 716,045 | Huske | Dec. 16, 1902 |
| 845,195 | Robbins | Feb. 26, 1907 |
| 887,466 | Davis | May 12, 1908 |
| 1,241,198 | Crane | Sept. 25, 1917 |
| 1,314,999 | Allen | Sept. 2, 1919 |
| 1,775,142 | Sanborn | Sept. 9, 1930 |
| 2,167,244 | Luchto | July 25, 1939 |